US011644687B2

(12) United States Patent
Keane

(10) Patent No.: US 11,644,687 B2
(45) Date of Patent: *May 9, 2023

(54) MULTIFOCAL LENSES WITH OCULAR SIDE LENS SEGMENTS

(71) Applicant: Digital Vision, Inc., Portland, OR (US)

(72) Inventor: Gordon Keane, Portland, OR (US)

(73) Assignee: Digital Vision, Inc., Portland, OR (US)

( * ) Notice: Subject to any disclaimer, the term of this patent is extended or adjusted under 35 U.S.C. 154(b) by 306 days.

This patent is subject to a terminal disclaimer.

(21) Appl. No.: 16/835,183

(22) Filed: Mar. 30, 2020

(65) Prior Publication Data

US 2020/0363657 A1 Nov. 19, 2020

Related U.S. Application Data

(62) Division of application No. 15/874,660, filed on Jan. 18, 2018, now Pat. No. 10,634,935.

(51) Int. Cl.
*G02C 7/06* (2006.01)
*G02C 7/02* (2006.01)

(52) U.S. Cl.
CPC ............ *G02C 7/06* (2013.01); *G02C 7/024* (2013.01); *G02C 7/027* (2013.01)

(58) Field of Classification Search
CPC .......... G02C 7/068; G02C 7/08; G02C 7/086; G02C 7/088; G02C 7/06; G02C 7/024; G02C 7/027; G02C 7/028; G02C 7/061
See application file for complete search history.

(56) References Cited

U.S. PATENT DOCUMENTS

| 4,846,913 A * | 7/1989 | Frieder .................... G02C 7/06 351/159.75 |
|---|---|---|
| 5,217,335 A | 6/1993 | Houchens et al. |
| 5,550,599 A | 8/1996 | Jannard |
| 6,142,628 A | 11/2000 | Saigo et al. |
| 6,817,713 B2 | 11/2004 | Ueno et al. |
| 7,188,082 B2 | 3/2007 | Keane et al. |
| 8,002,406 B2 | 8/2011 | Arrigotti et al. |
| 8,014,894 B2 | 9/2011 | Kendig et al. |
| 8,340,799 B2 | 12/2012 | Hagen et al. |
| 8,599,301 B2 | 12/2013 | Dowski, Jr. et al. |
| 8,639,372 B2 | 1/2014 | Hagen et al. |
| 8,641,192 B2 | 2/2014 | Arrigotti et al. |

(Continued)

FOREIGN PATENT DOCUMENTS

WO 0237168 A2 5/2002

OTHER PUBLICATIONS

Meister, D. "The Optics of Free-Form Progressive Lenses," 20/20 mag. (online), Oct. 2008. Retrieved Dec. 6, 2017 <https://www.2020mag.com/ce/the-optics-of-free-form>. 10 pages.

*Primary Examiner* — James R Greece
(74) *Attorney, Agent, or Firm* — Perkins Coie LLP

(57) ABSTRACT

Systems and methods for creating and/or manufacturing progressive lenses (e.g., bifocal, multifocal, and so on) having ocular side (e.g., back side or surface) lens segments, are described. For example, the systems and methods may apply round lens segments to ocular sides or surfaces of progressive lenses, providing the lenses with specializing vision lens segments and/or power enhancement lens segments, which may combine with front surface power additions provided by the multifocal lens segments applied to the front surfaces of the lenses.

20 Claims, 8 Drawing Sheets

(56) References Cited

U.S. PATENT DOCUMENTS

| | | |
|---|---|---|
| 9,039,170 B2 | 5/2015 | Arrigotti et al. |
| 9,057,886 B2 | 6/2015 | McCarty et al. |
| 9,671,624 B2 | 6/2017 | Hagen et al. |
| 9,952,584 B2 | 4/2018 | Arrigotti et al. |
| 10,416,657 B2 | 9/2019 | Arrigotti et al. |
| 10,634,935 B2 * | 4/2020 | Keane ................... G02C 7/06 |
| 2002/0176052 A1 | 11/2002 | Ueno et al. |
| 2003/0048407 A1 * | 3/2003 | Rivera ................. G02C 5/126 351/135 |
| 2006/0227288 A1 | 10/2006 | Seibert |
| 2008/0110306 A1 | 5/2008 | Kendig et al. |
| 2009/0109397 A1 | 4/2009 | Arrigotti et al. |
| 2009/0250828 A1 * | 10/2009 | Rosen ............. B29D 11/00125 425/162 |
| 2010/0023555 A1 | 1/2010 | Macaskill et al. |
| 2010/0165134 A1 | 7/2010 | Dowski et al. |
| 2011/0261318 A1 * | 10/2011 | Spratt ............. B29D 11/00028 264/1.32 |
| 2011/0297559 A1 | 12/2011 | Davis et al. |
| 2012/0262668 A1 | 10/2012 | McCarty et al. |
| 2013/0297057 A1 | 11/2013 | Wildsmith et al. |
| 2014/0016088 A1 | 1/2014 | De Rossi et al. |
| 2015/0153589 A1 * | 6/2015 | Meschenmoser ...... G02C 7/068 351/159.48 |
| 2015/0277418 A1 | 10/2015 | Arrigotti et al. |
| 2016/0114542 A1 | 4/2016 | Quere et al. |
| 2019/0219840 A1 | 7/2019 | Keane |

\* cited by examiner

MULTIFOCAL LENSES WITH OCULAR SIDE LENS SEGMENTS

CROSS-REFERENCES TO RELATED APPLICATIONS

This application is a division of U.S. patent application Ser. No. 15/874,660, filed on Jan. 18, 2018, and entitled "MULTIFOCAL LENSES WITH OCULAR SIDE LENS SEGMENTS," the disclosure of which is hereby incorporated herein in its entirety by reference.

BACKGROUND

Typically, traditional multifocal lenses, such as progressive lenses, flat-top lenses, round lenses, and so on provide users with a seamless progression of powers, facilitating a clear vision of all viewing distances. However, lenses having a strong prescription (such as those having a small or short radii of curvature) are often bulky and inconvenient to a user wearing eyeglasses with such lenses. These users may suffer from a "coke bottle effect," where the thickness of the lens causes the eyeglasses (and the user wearing them) to look unattractive at the periphery of the lenses.

Further, although such lenses may remove lines between lens segments, such as those visible in traditional bifocals, they are generally singularly purposed—to provide users with normal, clear vision at all distances. However, there may be times when users (e.g., golfers, pilots, and so on) require specialized powered segments, which cannot be accommodated or provided by traditional multifocal lenses. Further, such multifocal lenses often cannot provide power enhancements, such as large "add power" enhancements, required by users.

DETAILED DESCRIPTION

Introduction and Overview of Technology

Figure 1:
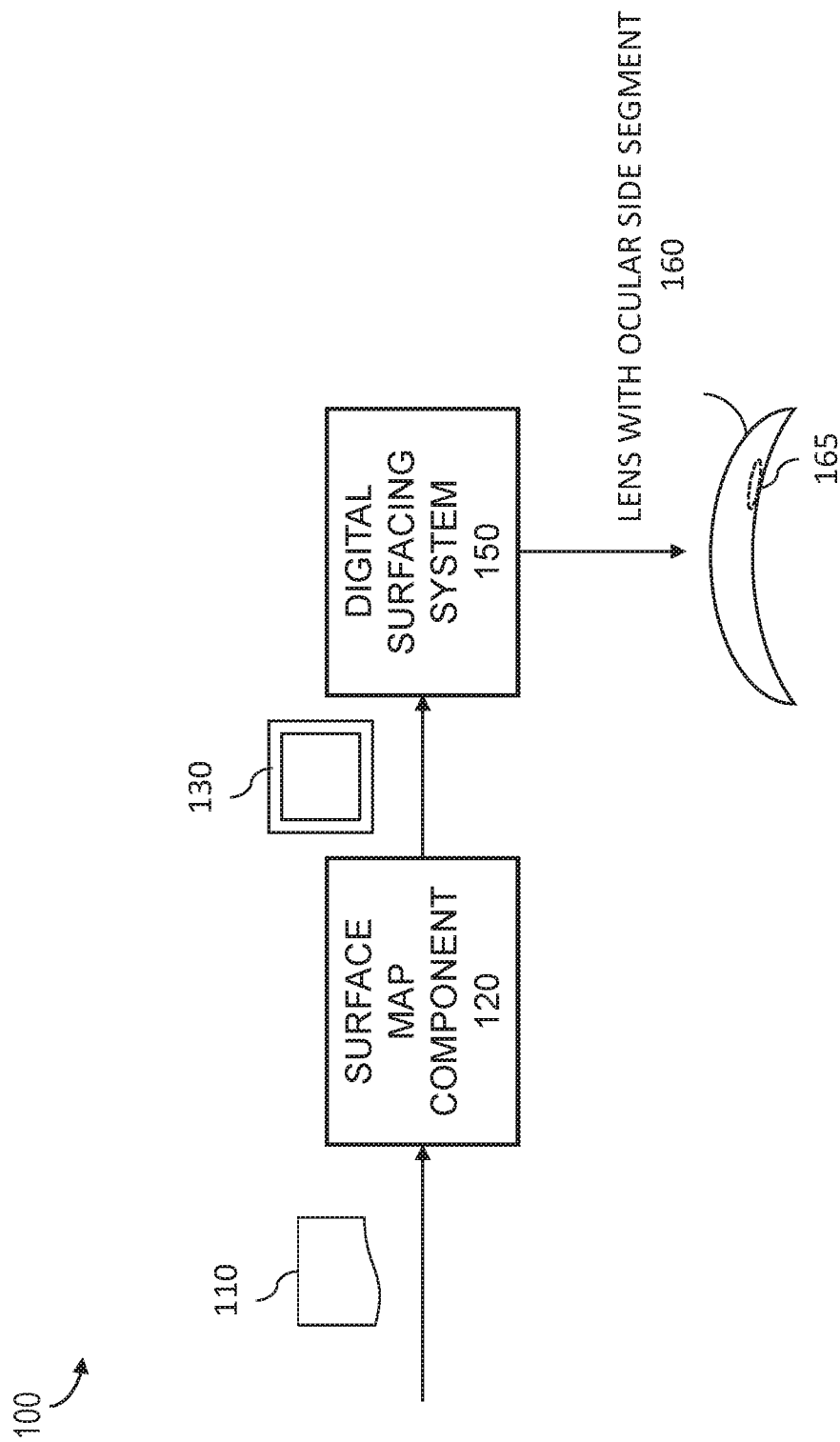
FIG. 1 is a block diagram illustrating a suitable system for manufacturing a multifocal lens with an ocular side lens segment.

Systems and methods for creating and/or manufacturing multifocal lenses (e.g., bifocal, progressive, flat-tops, round, and so on) having ocular side (e.g., back side or surface) lens segments, are described. For example, the systems and methods may apply round lens segments to ocular sides or surfaces of multifocal (e.g., progressive) lenses, providing the lenses with specializing vision lens segments and/or power enhancement or refinement lens segments at targeted locations, which may combine with front surface power additions provided by the multifocal lens segments applied to the front surfaces of the lenses.

In manufacturing such lenses having both front and back surface lens segments, the systems and methods may employ digital surfacing techniques to create and/or apply the lens segments to the lens surfaces. Digital surfacing, and other soft tool based surfacing, allows manufacturers to create an infinite number of surfaces on lenses, unlike traditional lathing and lapping techniques described herein.

For example, using digital surfacing, a diamond or other similar type of cutter produces a back surface segment of a lens according to a specified depth, at a precision of one tenth of a micron or less. Thus, digital surfacing, in some cases, enables manufacturers to create non-spherical surfaces on lenses, such as specialized digital round lens segments applied to ocular side surfaces.

Where previous techniques of creating lens segments onto a surface (e.g., using lathes and laps) could not achieve such specialized requirements, forming digitally created round (or other geometrically shaped) lens segments or sections on the back surfaces of lenses enables professionals to create lenses having patient specific optical and/or cosmetic benefits, specialized vision areas, and so on, while maximizing the optical quality of the lenses.

Therefore, in some embodiments, the systems and methods provide a lens for use with eyeglasses. The lens includes a front surface having a multifocal area, and a back surface having a lens segment. The back surface may include a lens segment positioned to enhance the power addition supplied by a front surface multifocal segment, and/or a lens segment positioned to provide a specialized bifocal segment, such as a golf segment that enables clear vision for objects in a specific area of vision, a pilot segment that enables clear vision for objects above a user's normal range of vision, or other such specialized or vision targeted segments.

Further, in some embodiments, the systems and methods provide a method of manufacturing a lens for use with eyeglasses. The systems and methods may receive a lens blank (such as a lens blank having a front side multifocal area), define a digital round segment to be applied to an ocular surface of the received lens blank, generate a digital surface map based on the defined round segment to be applied to the ocular surface of the received lens blank, and apply a round segment onto a specific area of the ocular surface of the lens blank based on the generated digital surface map.

Various examples of the technology will now be described. The following description provides specific details for a thorough understanding and enabling description of these examples. One skilled in the art will understand, however, that the technology may be practiced without many of these details. Additionally, some well-known structures or functions may not be shown or described in detail, so as to avoid unnecessarily obscuring the relevant description of the various examples.

The terminology used in the description presented below is intended to be interpreted in its broadest reasonable manner, even though it is being used in conjunction with a detailed description of certain specific examples of the technology. Certain terms may even be emphasized below; however, any terminology intended to be interpreted in any restricted manner will be overtly and specifically defined as such in this Detailed Description section.

Examples of a Suitable Lens Manufacturing System

As described herein, aspects of the systems and methods enable eyeglass manufacturers and other eye care professionals to apply various different lens segments to the back, or ocular, surfaces of lenses, such as multifocal lenses having front surface corrective areas. FIG. 1 is a block diagram illustrating a suitable environment 100 for manufacturing a multifocal lens with an ocular side lens segment.

The environment 100 includes a digital surfacing system 150. A digital surfacing system 150 performs soft tool based surfacing, allowing manufacturers to create an infinite number of surfaces on lenses. The system 150 may include various computer-controlled surfacing equipment or devices, which are generally more precise than conventional tools.

For example, the system 150 may receive a file, such as a digital surface map file 130, which defines a lens surface (e.g., a surface having a round lens segment) to be applied to the back surface of a lens blank. A surface map component 120, such as a surface map generator, may create the surface map (e.g., layout specifications of a lens segment) based on prescription information 110 for a patient.

In creating a job to manufacture a lens for the patient, the component 120 may receive various prescription information indicative of corrections or special lens segments to be applied to the lens. Using the prescription information, the surface map component may generate map surface information, such as add power information, segment size information, blend width information, and so on. Some or all of the information may also be input by an eye care professional or other user of the system 150.

In some cases, the map component 120 accesses various data files to perform lens layout or location calculations and determine appropriate lens tool settings for manufacturing a custom lens. Examples of accessed data files include lens stock data, frame stock data, surfacing data, finishing data, and other miscellaneous data files.

Examples of lens stock data include style attributes, such as minimum fitting height for progressive lenses; material attributes, such as tintability and compatibility with various coatings; recommended lens base curve selection information for use with particular eyeglass prescriptions; lens technical information, such as lens blank dimensions and curve measurements; lens inventory in the laboratory; and lens selection criteria for which manufacturer's lens blank and which lens size to use for a given prescription, ranked according to the laboratory's preferences. Examples of frame stock data includes size and color availability; whether a frame is available for requested eye, bridge, and/or temple measurements; and technical details, such as the minimum lens edge thickness and compatible lens base curve. Examples of surfacing data include setup files for the generator (e.g., a surfacing machine); prism data that tells how much prism the generator is capable of producing in a generated lens; information about the dimensions of the blocks used to hold the lenses in the generator; information about the tools the generator uses to grind lenses and the pads placed on the tools, such as the diameter and curvature of the tools and thickness of the pads; and gauge data that provides the type of gauge used to measure the lens curves and thicknesses. Examples of finish data include the shape and circumference of a lens to fit into a frame; the location of the edge bevel or groove; and the position and shape of drill holes. Examples of other data files include information that flags preferences or warnings that are specific to a particular account and/or doctor, such as a doctor or patient/patient group specifying an anti-reflective coating on every order.

The system 150 utilizes the digital surface map 130 (and/or other information) as instructions, and directs a surfacing tool (e.g., a cutter tool) to apply (e.g., sculpt) the mapped surface to the back surface of the lens blank. In some cases, the tool may be a diamond or other similar type of cutter capable of producing a back surface segment of a lens according to a specified depth, at a precision of one tenth of a micron or smaller.

In some cases, the system 150 may perform a single job and directly apply both a front surface multifocal (e.g., progressive) area and a back surface round lens segment. However, in other cases, the system 150 may manufacture the lens 160 as a series of sequential jobs, a first job to receive and/or apply a front surface multifocal area, and a second job to apply the round segment to the back surface. For example, the system 150 may employ various 3D printing techniques to create segments on both surfaces of a lens. Once complete, the system 150 refines and finalizes the newly created lens 160, which contains the round segment 165 on a back surface of the lens 160.

FIG. 1 and the discussion herein provide a brief, general description of a suitable computing environment in which the environment 100 can be supported and implemented. Although not required, aspects of the system are described in the general context of computer-executable instructions, such as routines executed by a general-purpose computer, e.g., mobile device, a server computer, or personal computer. Those skilled in the relevant art will appreciate that the system can be practiced with other communications, data processing, or computer system configurations, including: Internet appliances, hand-held devices (including tablet computers and/or personal digital assistants (PDAs)), all manner of cellular or mobile phones, multi-processor systems, microprocessor-based or programmable consumer electronics, network PCs, mini-computers, mainframe computers, voice-controlled devices, and so on.

Aspects of the system can be embodied in a special purpose computing device or data processor that is specifically programmed, configured, or constructed to perform one or more of the computer-executable instructions explained in detail herein. Aspects of the system may also be practiced in distributed computing environments where tasks or modules are performed by remote processing devices, which are linked through a communications network, such as a Local Area Network (LAN), Wide Area Network (WAN), or the Internet. In a distributed computing environment, program modules may be located in both local and remote memory storage devices.

Aspects of the system may be stored or distributed on computer-readable media (e.g., physical and/or tangible computer-readable storage media, such as non-transitory media), including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the system may be distributed over the Internet or over other networks (including wireless networks) or they may be provided on any analog or digital network (packet switched, circuit switched, or other scheme). Those skilled in the relevant art will recognize that portions of the system reside on a server computer, while corresponding portions reside on a client computer such as a mobile or portable device, and thus, while certain hardware platforms are described herein, aspects of the system are equally applicable to nodes on a network. In an alternative embodiment, the mobile device or portable device may represent the server portion, while the server may represent the client portion.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein. Moreover, any two or more of the machines, databases, or devices illustrated in FIG. 1 may be combined into a single machine, and the functions described herein for any single machine, database, or device may be subdivided among multiple machines, databases, or devices.

Examples of Creating Multifocal Lenses with Ocular Side Lens Segments

Figure 2:
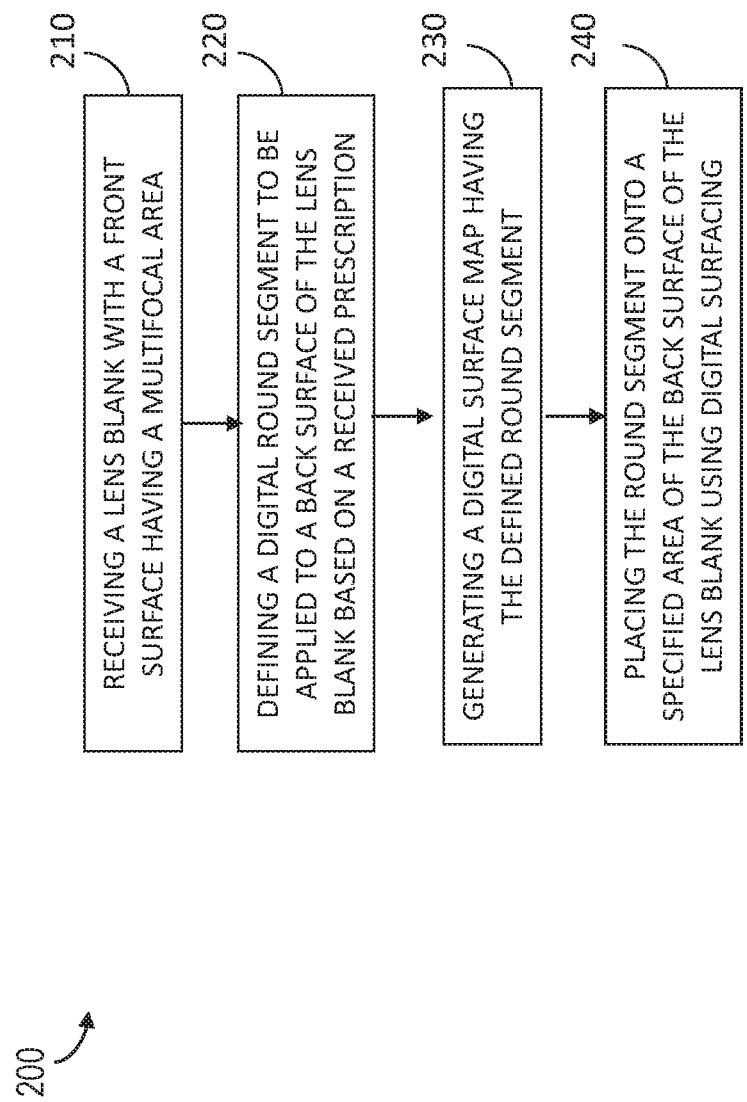
FIG. 2 is a flow diagram illustrating a method of manufacturing a multifocal lens with an ocular side lens segment.

As described herein, in some embodiments, the digital surfacing system 150 facilitates the creation and/or manufacture of multifocal lenses having ocular side lens segments, such as round segments. FIG. 2 is a flow diagram illustrating a method 200 of manufacturing a multifocal lens with an ocular side lens segment. The method 200 may be performed by the digital surfacing system 150 and/or the surface map component 120, and, accordingly, is described herein merely by way of reference thereto. It will be appreciated that the method 200 may be performed on any suitable hardware.

In operation 210, the system 150 receives a lens blank with a front surface having an applied multifocal area. As described herein, the system 150 may apply a progressive or other multifocal segment (e.g., bifocal, trifocal, and so on), or area to the front surface during a job, or may receive a semi-finished lens blank with a modified front surface. Typically, the front surface includes an add power that is applied in 0.25 Diopter increments.

In operation 220, the surface map component 120 defines a digital round segment to be applied to a back, or ocular, surface of the received lens blank. For example, the surface map component 220 may utilize information from a patient's prescription when defining the round segment. Example prescription information may include add power information, optical center information, and so on.

In operation 230, the surface map component 120 generates a digital surface map that defines the round segment to be applied to the back surface of the lens. For example, the component 220 may determine and/or receive information identifying a block diameter of the lens blank, a base curve of the lens blank, layout information (such as based on optical center information), add power information, placement information, diameter information, height map information, size information, blend information, and so on.

In some embodiments, the surface map component 120 and/or the digital surfacing system 150 may include a user interface, such as an interface configured to facilitate the input of information, instructions, and/or other data useful in defining the digital surface maps and/or associated lens segments. The user interface may include a series of fields that define certain information, such as the information defining the round segment to be applied to the back surface of a lens.

As described herein, the fields may receive information defining a location or placement of the lens segment (e.g., with respect to a defined optical center), information indicating an enhanced add power for the lens segment, information defining a blending zone for the lens segment, information specifying a width of the lens segment, information specifying a shape or geometry (e.g., round, oval, and so on), of the lens segment, and so on.

In operation 240, the digital surfacing system 150 places, sculpts, or otherwise applies a round segment onto a specific area of the back surface of the lens based on the generated surface map via digital surfacing techniques. For example, the system 150 applies, using the surface map information, a round segment to the back surface of a multifocal lens (e.g., a lens having a front surface with a multifocal lens). In some cases, the system 150 may apply the round segment in 0.01 Diopter increments, depending on what is prescribed for a user.

Thus, in some embodiments, the systems and methods generate, create, and/or manufacture a lens for use with eyeglasses. For example, the systems and methods utilize the digital surfacing system 150 to perform a method for creating a lens for use with eyeglasses, where the system 150 receives a digital surface map that defines a round segment to be applied to a back surface of a progressive lens, and instructs one or more digital surfacing tools of the digital surfacing system 150 to apply the defined round segment to the back surface of the progressive lens. The digital surface map is based on or includes information specifying an enhanced add power for the round segment, information defining a blending zone for the round segment, information specifying a width of the round segment, and so on.

Figure 3:
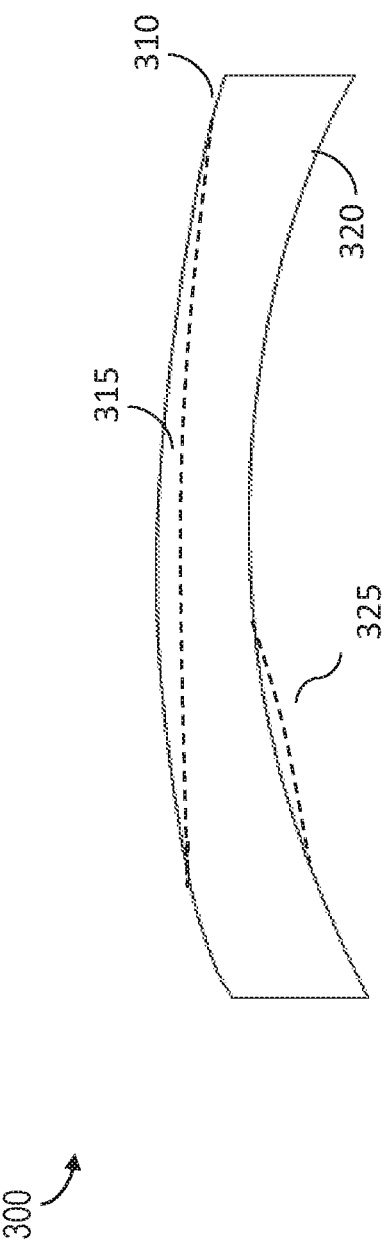
FIG. 3 is a diagram illustrating a multifocal lens with an ocular side lens segment.

FIG. 3 illustrates a created multifocal lens with an ocular side lens segment. The lens 300 includes a progressive area 315 (e.g., a bifocal, trifocal, multifocal, and so on) applied to a front surface 310 of the lens, and a round segment 325 applied to a back, or ocular, surface 320 of the lens 300.

As described herein, the systems and methods enable the application of a variety of different lens segment configurations, such as lens segments that enhance the optical power of a multifocal lens, and/or lens segments that provide specialized or targeted bifocal segments, such as bifocal segments useful in certain vocations (e.g., golf, aviation, woodworking, and so on).

As an example, an eye doctor orders a digital progressive lens with a 600 add power to be made for a patient. A typical digital processing system cannot create a lens with a progressive segment applied to a front side of lens having such a large add power. However, as described herein, the systems and methods receive a front surface progressive lens (e.g., a Varilux Comfort with 300 add power) as a lens blank, and create, using the techniques described herein, an add enhancer round segment having an add power of 300, at a specific location on the back surface, which aligns to the front surface, achieving a total add power of 600, as prescribed.

Figure 4A:
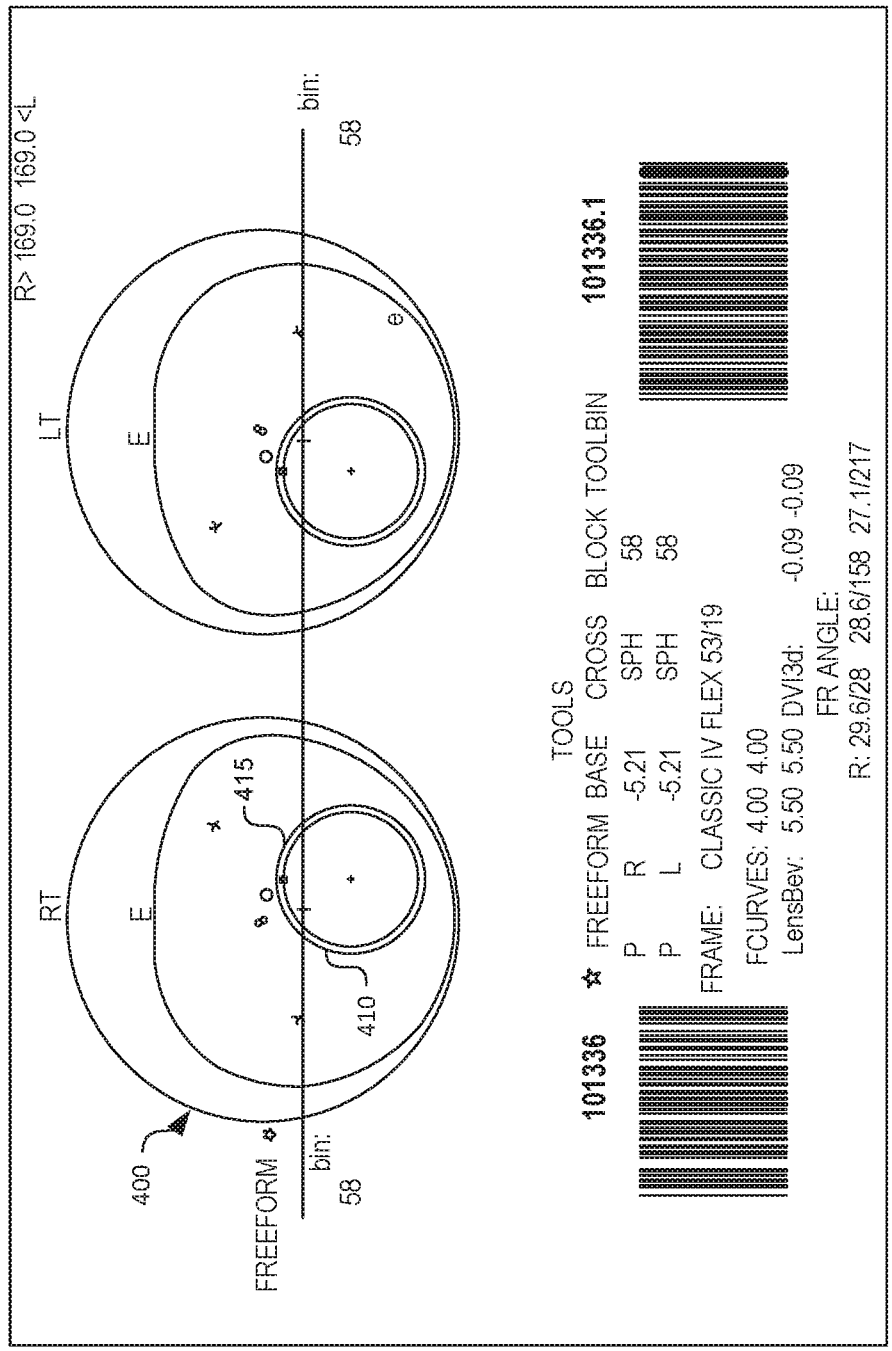
FIGS. 4A-4E are diagrams illustrating example configurations of multifocal lenses having ocular side lens segments.

FIGS. 4A-4E are diagrams illustrating example configurations of multifocal lenses having ocular side lens segments. FIG. 4A depicts a traditional round seg bifocal lens 400, with an enhanced round segment 415 applied to increase and/or refine the add power of a round seg bifocal 410 applied to a front surface of a lens 400. The configuration enables, for example, a front-side multifocal lens, which normally is not available in an add power greater than 3.50 D (Diopters), to be enhanced with a back surface blended round segment to provide a total reading addition of 7.00 D or greater.

Further, such a configuration, in some embodiments, facilitates more specific, refined, and/or granular add powers to be applied to lenses, such as bifocals and other multifocal lenses. For example, a front side multifocal typically provides an add power in 0.25 Diopter increments. However, the systems describe herein can add the back surface segments in 0.01 Diopter increments. Therefore, the systems may provide for add powers that are within the typical 0.25 D increments (e.g., a 2.0 D front surface add power plus a 0.1 back surface add power provides for a 2.1 D combined add power for the lens).

Figure 4B:
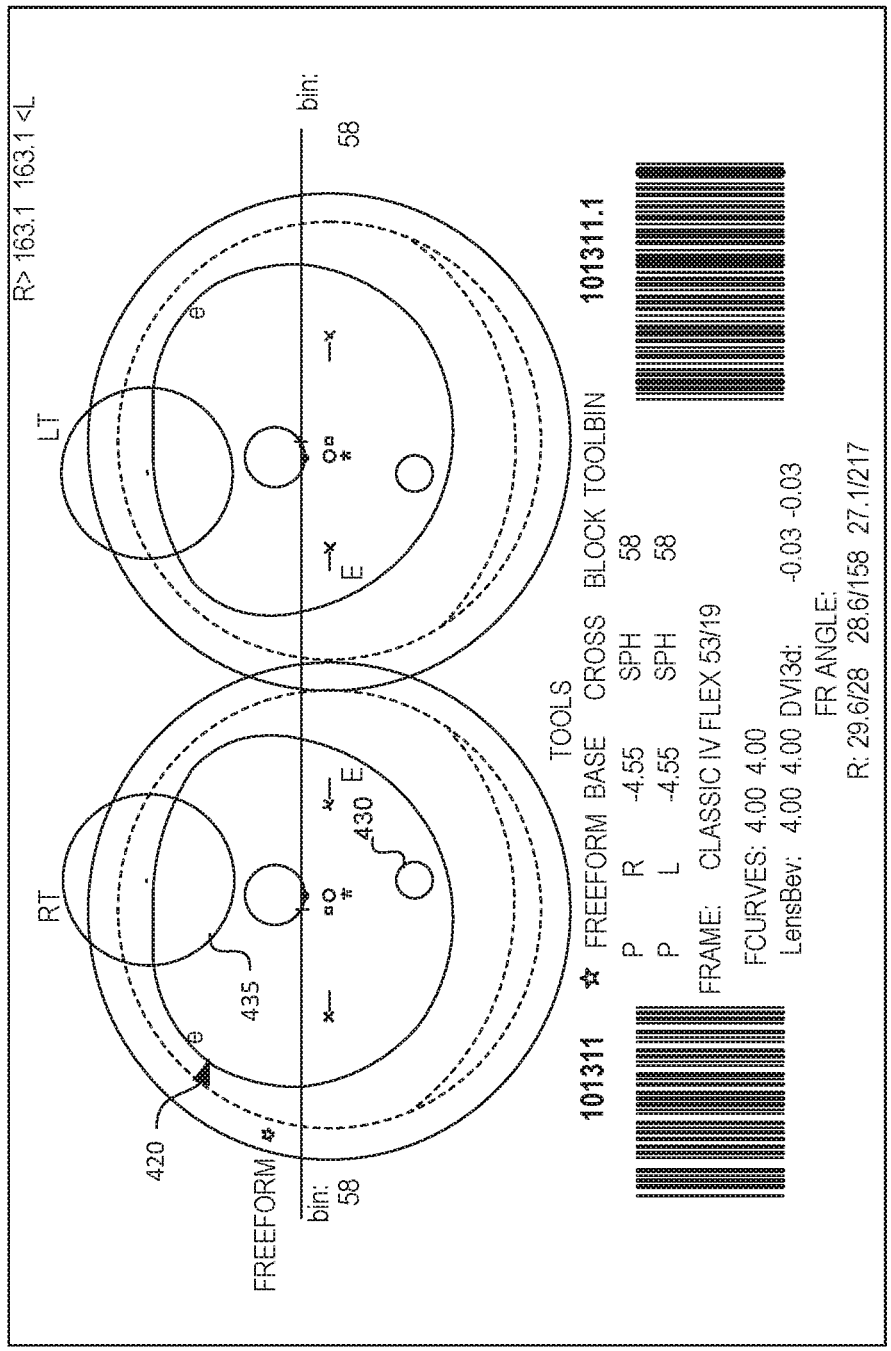

FIG. 4B depicts an enhanced round segment 435 applied to a lens 420, with a front surface progressive area 430. The round segment 435 is placed as a vocational upper add power segment, providing a specific area for bifocal add power. The configuration enables, for example, airline pilots, plumbers and other users within work related situations to utilize upward positioned bifocals for close work above their heads. Traditional progressive lenses cannot provide such functionality. Thus, the systems and methods, in providing a back surface blended round segment, provides the specialized bifocal to a multifocal lens.

Figure 4C:
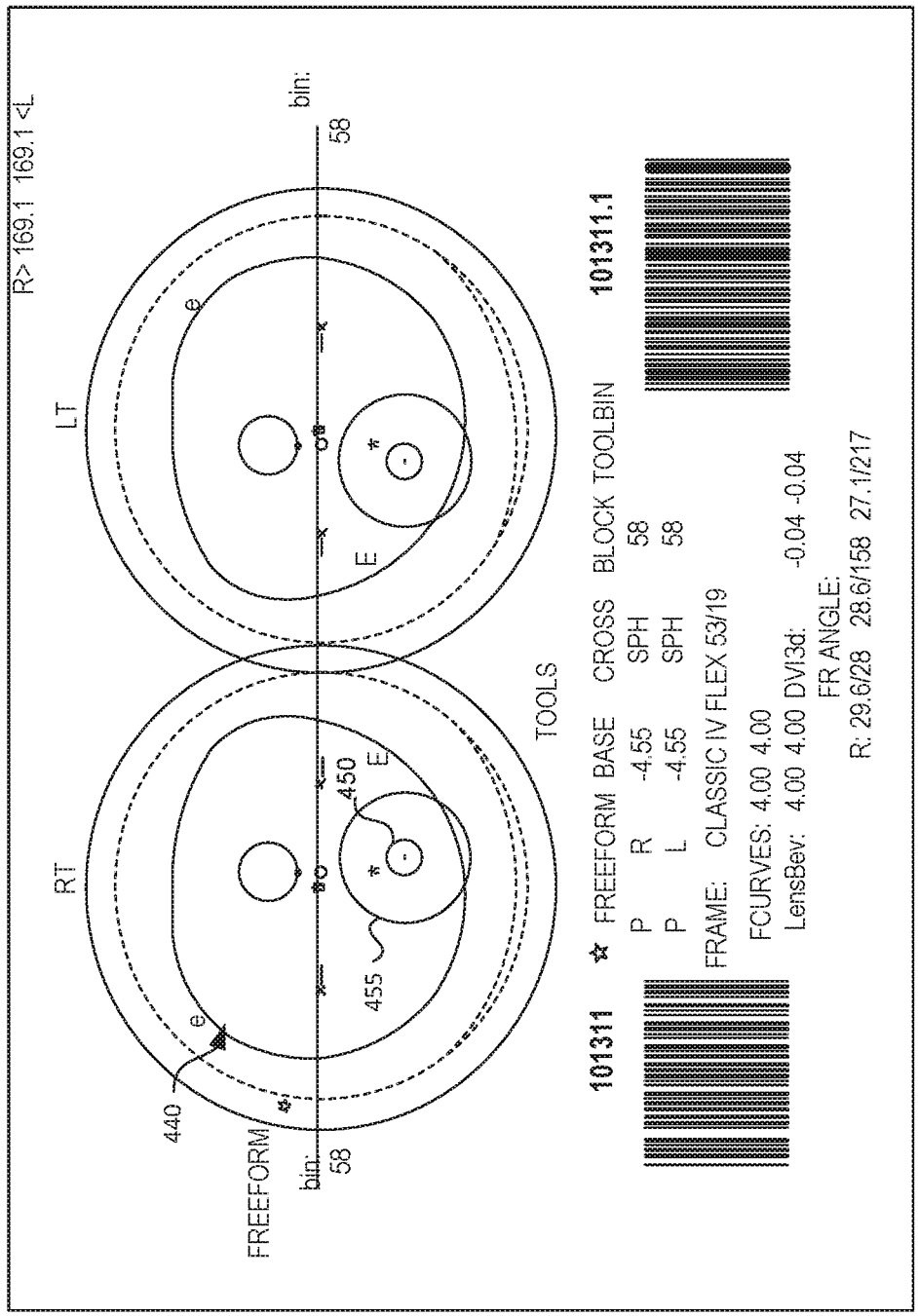

FIG. 4C depicts an enhanced round segment 455 applied to a lens 440, with a progressive area 450. The lens segment provides additional add power to a lens already providing 4.00 D via the front surface multifocal area 450. In doing so, the lens segment 455, in having a concentric, back surface blended round segment, enhances the add power of the lens 440 at the reading area of the lens, without typical cosmetic disadvantages of increasing the power on the front surface of the lens 440.

Figure 4D:
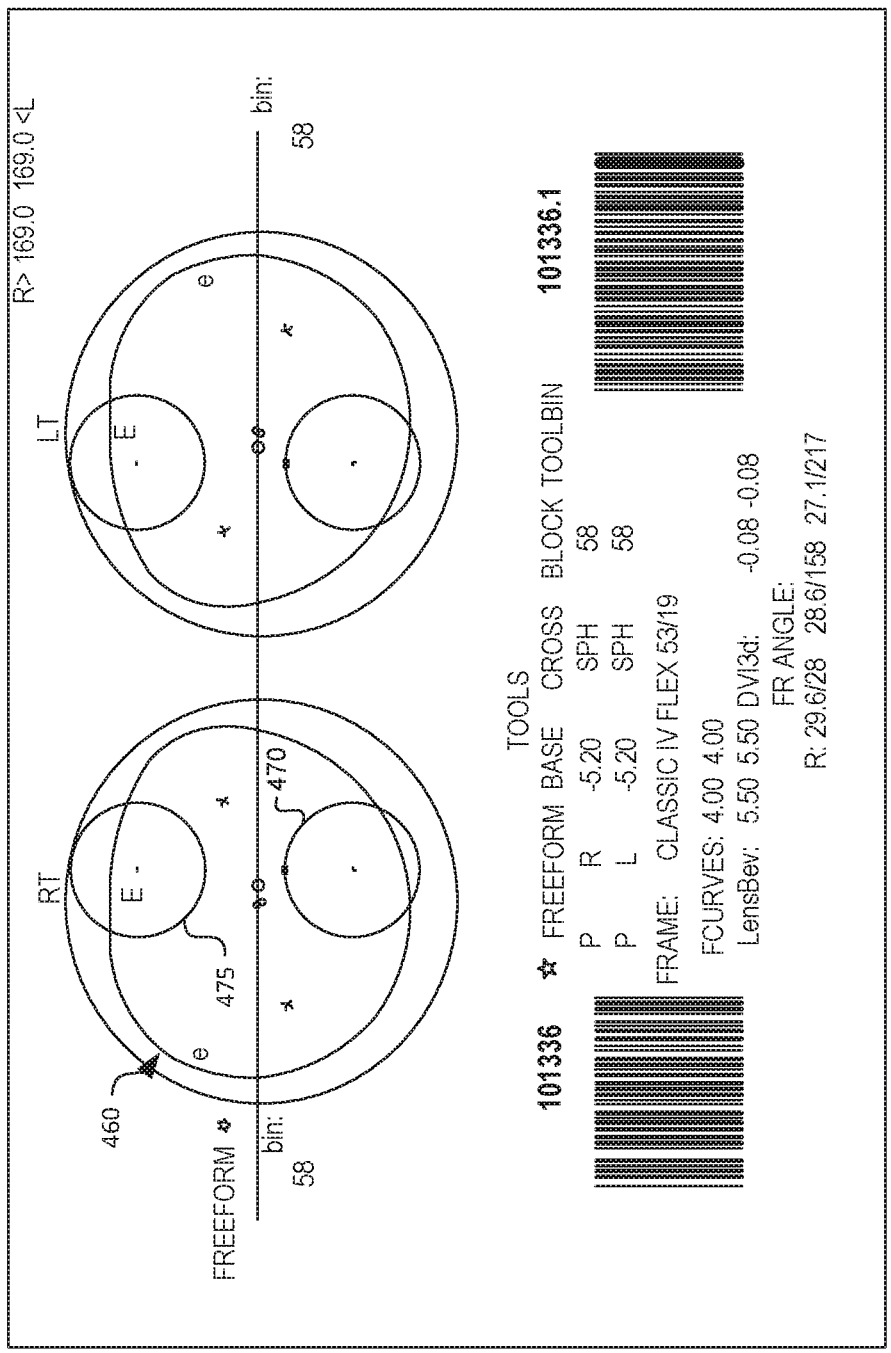

FIG. 4D depicts a first enhanced round segment 470 and a second enhanced round segment 475 applied to a lens 460 that otherwise has no front side multifocal area. The round segments 470, 475 are placed as vocational upper and lower add power segments, providing specific areas for bifocal add power.

Figure 4E:
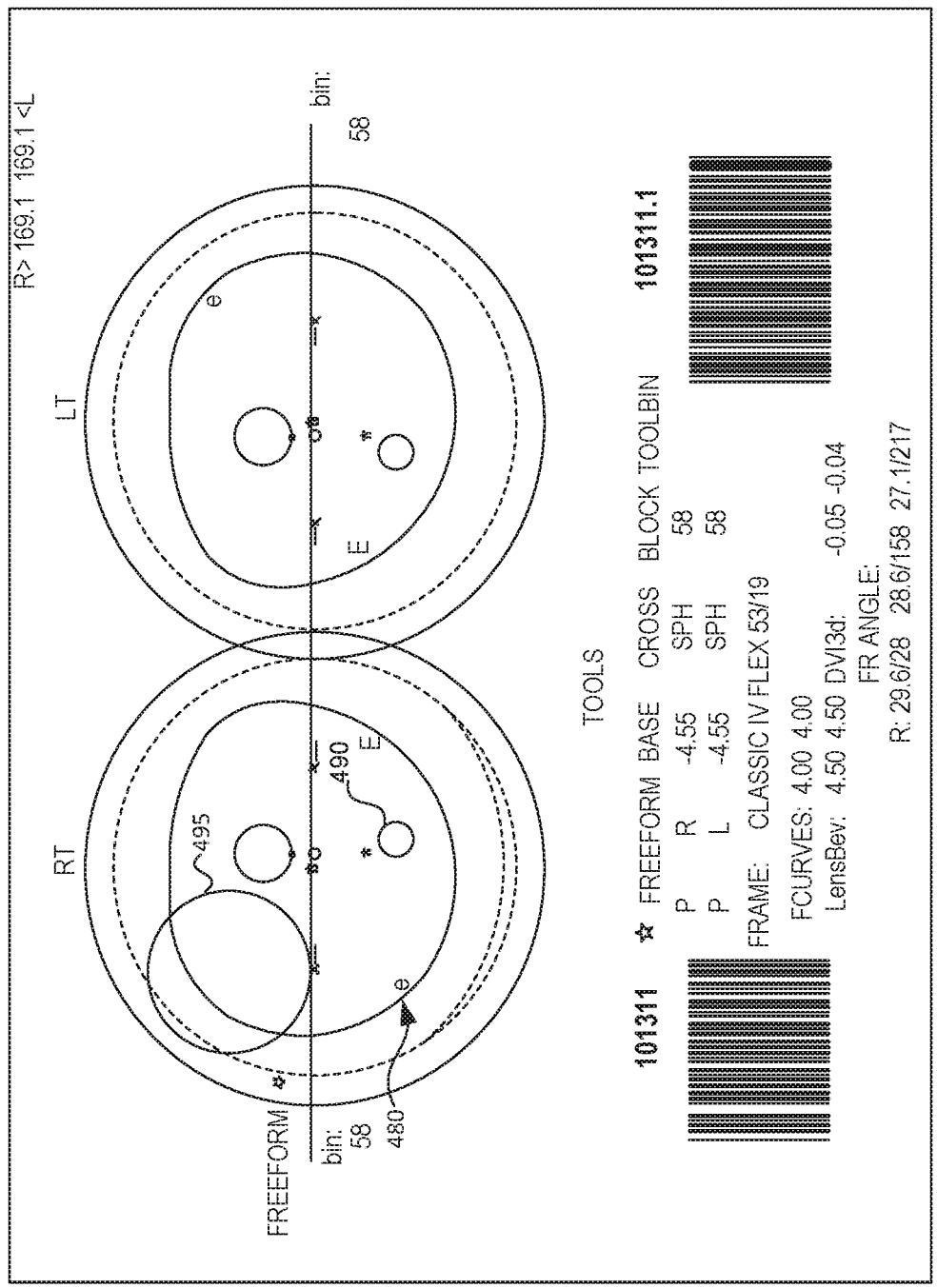

FIG. 4E depicts an enhanced round golf segment 495 applied to a lens 480, with a progressive area 490. The lens 480 is enhanced with a back surface blended round segment 495 positioned up and out in one eye, for use in reading score cards in golf (and useful in other similar pursuits), where a lower add power for a golfer is not designed for reading, but for intermediate distance (to the ball).

Thus, as depicted in the various embodiments described herein, the systems and methods facilitate the creation and manufacture of enhanced digital round segments (or segs) that can be placed on conventional front side multifocals (e.g., round segments, progressives, and/or lined multifocals).

Such lens segments, being placed on back surfaces of lens, may enhance, increase, and/or refine or incrementally adjust conventional lens style add powers. Further, the systems and methods, in utilizing digital surfacing techniques, provide for easy and specialized placement of rear side round segments for occupational, vocational, and/or other specialized uses, among other benefits.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

I claim:

1. A lens for use with eyeglasses, the lens comprising:
a front surface having a multifocal area,
wherein the multifocal area includes a bifocal area or a trifocal area; and
a back surface having a round segment,
wherein the round segment has a width and placement location defined, at least in part, by a prescription provided to a wearer of the eyeglasses,
wherein the lens is created from a semi-finished lens blank having the multifocal area and using a digital surface map based on the round segment to be applied to the back surface, and
wherein the digital surface map includes information specifying an optical power for the round segment, information defining a blending zone for the round segment, and information specifying the width of the round segment.

2. The lens of claim 1, wherein the round segment is applied to the back surface of the lens using digital surfacing.

3. The lens of claim 1, wherein the optical power is a first optical power, wherein an optical power segment of the multifocal area has a second optical power, and wherein the round segment is positioned such that the first optical power of the round segment is applied to the back surface in combination with the second optical power of the optical power segment of the multifocal area to provide a combined power for the lens that is associated with the prescription for the wearer of the eyeglasses.

4. The lens of claim 1, wherein the round segment is applied to an upper area of the back surface.

5. The lens of claim 1, wherein the round segment is applied to a lower area of the back surface of the lens.

6. The lens of claim 3 wherein the round segment is at least partially aligned with the optical power segment of the multifocal area in a direction extending between the front surface and the back surface.

7. The lens of claim 1 wherein the round segment does not overlap an optical power segment of the multifocal area, and wherein the optical power comprises a bifocal add power.

8. A lens for use with eyeglasses, the lens comprising:
a front surface having a multifocal area,
wherein the multifocal area includes a bifocal area, a trifocal area, or a progressive area; and
a back surface having a round segment,
wherein the round segment of the back surface has a width and placement location defined by a prescription provided to a wearer of the eyeglasses,
wherein the lens is created from a semi-finished lens blank having the multifocal area and using a digital surface map based on the round segment to be applied to the back surface, and
wherein the digital surface map includes information specifying an optical power for the round segment, information defining a blending zone for the round segment, and information specifying the width of the round segment.

9. The lens of claim 8, wherein the round segment is applied onto a specific area of the back surface using digital surfacing tools based on the digital surface map.

10. The lens of claim 8, wherein digital surfacing tools are employed to create the multifocal area to the front surface of a lens blank to create the semi-finished lens blank.

11. The lens of claim 8, wherein the optical power of the round segment is a first optical power, and wherein the bifocal segment is positioned such that the first optical power combines with second optical power of an optical power segment of the multifocal area to provide a combined optical power for the lens that is associated with a prescription for a patient.

12. The lens of claim 8, wherein the bifocal segment is created at an upper area of the back surface of the lens.

13. The lens of claim 8, wherein the bifocal segment is created at a lower area of the back surface of the lens.

14. The lens of claim 11 wherein the round segment is at least partially aligned with the optical power segment of the multifocal area in a direction extending between the front surface and the back surface.

15. A lens for use with eyeglasses, the lens created by a method comprising:
receiving a semi-finished lens blank having a front surface and a back surface,
wherein the front surface of the lens blank includes a multifocal area having a prescribed optical power segment;
generating a digital surface map based on a defined round segment to be applied to the back surface; and
applying a round segment to the back surface of the lens blank based on the generated digital surface map,
wherein the applied round segment is a vocational round segment providing a bifocal add power, and
wherein the applied round segment does not overlap, in a direction extending between the front and back surfaces of the lens blank, the optical power segment of the multifocal area of the front surface of the lens blank.

16. The lens of claim 15, wherein the round segment is applied onto a specific area of the back surface using digital surfacing tools based on the digital surface map.

17. The lens of claim 15, wherein digital surfacing tools are employed to create the multifocal area on the front surface of a lens blank to create the semi-finished lens blank.

18. The lens of claim 15, wherein the applied round segment is created at an upper area of the back surface of the lens.

19. The lens of claim 15, wherein the applied round segment is created at a lower area of the back surface of the lens.

20. The lens of claim 15, wherein the digital surface map further includes information defining a blending zone for the applied round segment on the back surface, and information specifying a width of the applied round segment.

* * * * *